(12) United States Patent
Nakanishi et al.

(10) Patent No.: US 11,073,449 B2
(45) Date of Patent: Jul. 27, 2021

(54) SMEAR PREPARING APPARATUS AND SMEAR PREPARING METHOD

(71) Applicant: SYSMEX CORPORATION, Kobe (JP)

(72) Inventors: Noriyuki Nakanishi, Kobe (JP); Mitsuo Yamasaki, Kobe (JP); Seiya Shinabe, Kobe (JP); Tetsuya Oda, Kobe (JP); Saki Kondo, Kobe (JP); Takayuki Nakajima, Kobe (JP)

(73) Assignee: SYSMEX Corporation, Kobe (JP)

( * ) Notice: Subject to any disclaimer, the term of this patent is extended or adjusted under 35 U.S.C. 154(b) by 842 days.

(21) Appl. No.: 15/687,702

(22) Filed: Aug. 28, 2017

(65) Prior Publication Data
US 2018/0058989 A1 Mar. 1, 2018

(30) Foreign Application Priority Data
Aug. 31, 2016 (JP) .............................. JP2016-170166

(51) Int. Cl.
| G01N 1/00 | (2006.01) |
| G01N 1/30 | (2006.01) |
| G01N 1/31 | (2006.01) |
| B01L 3/00 | (2006.01) |
| G01N 35/00 | (2006.01) |

(52) U.S. Cl.
CPC .................. *G01N 1/30* (2013.01); *B01L 3/52* (2013.01); *G01N 1/31* (2013.01); *G01N 1/312* (2013.01); *G01N 35/00029* (2013.01); *B01L 2200/143* (2013.01); *B01L 2200/16* (2013.01); *G01N 2001/302* (2013.01); *G01N 2001/307* (2013.01); *G01N 2035/00138* (2013.01)

(58) Field of Classification Search
None
See application file for complete search history.

(56) References Cited

U.S. PATENT DOCUMENTS

| 2011/0184570 A1 | 7/2011 | Nakanishi et al. |
| 2011/0223632 A1 | 9/2011 | Yamada et al. |
(Continued)

FOREIGN PATENT DOCUMENTS

| CN | 102192852 A | 9/2011 |
| CN | 102519764 A | 6/2012 |
(Continued)

OTHER PUBLICATIONS

A Communication pursuant to Article 94(3) EPC dated Nov. 26, 2019 in a counterpart European application.
(Continued)

*Primary Examiner* — Jyoti Nagpaul
(74) *Attorney, Agent, or Firm* — Metrolex IP Law Group, PLLC

(57) ABSTRACT

A smear preparing apparatus includes: a smear unit that prepares a smear slide by smearing a sample on a slide; a buffer solution preparation unit that prepares diluted buffer solution by diluting a highly-concentrated buffer solution; a diluted staining solution preparation unit that prepares diluted staining solution by diluting a highly-concentrated staining solution with the diluted buffer solution; and a stain unit that stains the smear slide prepared by the smear unit with the diluted staining solution.

19 Claims, 8 Drawing Sheets

(56) References Cited

U.S. PATENT DOCUMENTS

2012/0201721 A1* 8/2012 Yamasaki ........ G01N 35/00029
422/500
2013/0189730 A1 7/2013 Freeland et al.

FOREIGN PATENT DOCUMENTS

| | | |
|---|---|---|
| CN | 105628482 A | 6/2016 |
| JP | H04-291157 A | 10/1992 |
| JP | H05-264555 A | 10/1993 |
| JP | H08-304412 A | 11/1996 |
| JP | 2006-038781 A | 2/2006 |
| JP | 2010-230570 A | 10/2010 |
| JP | 2012-506995 A | 3/2012 |
| JP | 2012-159480 A | 8/2012 |
| JP | 2016-099326 A | 5/2016 |
| WO | 2016/084377 A1 | 6/2016 |

OTHER PUBLICATIONS

An Office Action (CNOA) dated Nov. 24, 2020 in a counterpart Chinese patent application.

* cited by examiner

SMEAR PREPARING APPARATUS AND SMEAR PREPARING METHOD

CROSS REFERENCE TO RELATED APPLICATIONS

This application claims priority based on 35 USC 119 from prior Japanese Patent Application No. 2016-170166 filed on Aug. 31, 2016, the entire contents of which are incorporated herein by reference.

BACKGROUND

The disclosure relates to a smear preparing apparatus and a smear preparing method of smearing a sample on a slide and staining the sample.

Japanese Patent Application Publication No. 2012-159480 (Patent Document 1) discloses a specimen preparing apparatus (smear preparing apparatus) which stains a specimen contained in a container with a staining solution. This specimen preparing apparatus of Patent Document 1 is configured to stain the specimen with a first staining solution (May-Grünwald solution) and to stain the specimen with a second staining solution (Giemsa solution). Here, the first staining solution and the second staining solution are diluted using a common buffer solution (phosphate buffer solution), and then used as staining solutions to stain the specimen.

A large amount of smear may be prepared in a large facility such as a medical examination center or a large hospital, and a large amount of buffer solution for diluting staining solutions is consumed there. Accordingly, the smear preparing apparatus of Patent Document 1 described above needs to be equipped with a large volume of tank of the buffer solution in order to decrease the frequency of replacing the tank of the buffer solution. In this case, a user needs to replace the large-volume tank of the buffer solution, which increases a load on a user during the replacement. To address this, there are demands for a smear preparing apparatus and a smear preparing method which can decrease the frequency of replacing or supplying buffer solution and reduce a load on a user during the replacement.

One aspect of the invention aims to decrease the frequency of replacing or supplying buffer solution and reduce a load or a burden on a user during the replacement.

SUMMARY

One or more embodiments of smear preparing apparatus may include: a smear unit that prepares a smear slide by smearing a sample on a slide; a buffer solution preparation unit that prepares diluted buffer solution by diluting a highly-concentrated buffer solution; a diluted staining solution preparation unit that prepares diluted staining solution by diluting a highly-concentrated staining solution with the diluted buffer solution; and a stain unit that stains the smear slide prepared by the smear unit with the diluted staining solution.

One or more embodiments of smear preparing method may include: preparing a smear slide by smearing a sample on a slide; preparing a diluted buffer solution by diluting a highly-concentrated buffer solution; preparing a diluted staining solution by diluting a highly-concentrated staining solution with the diluted buffer solution; and staining the smear slide with the sample smeared thereon by using the diluted staining solution.

DETAILED DESCRIPTION

Figure 1:
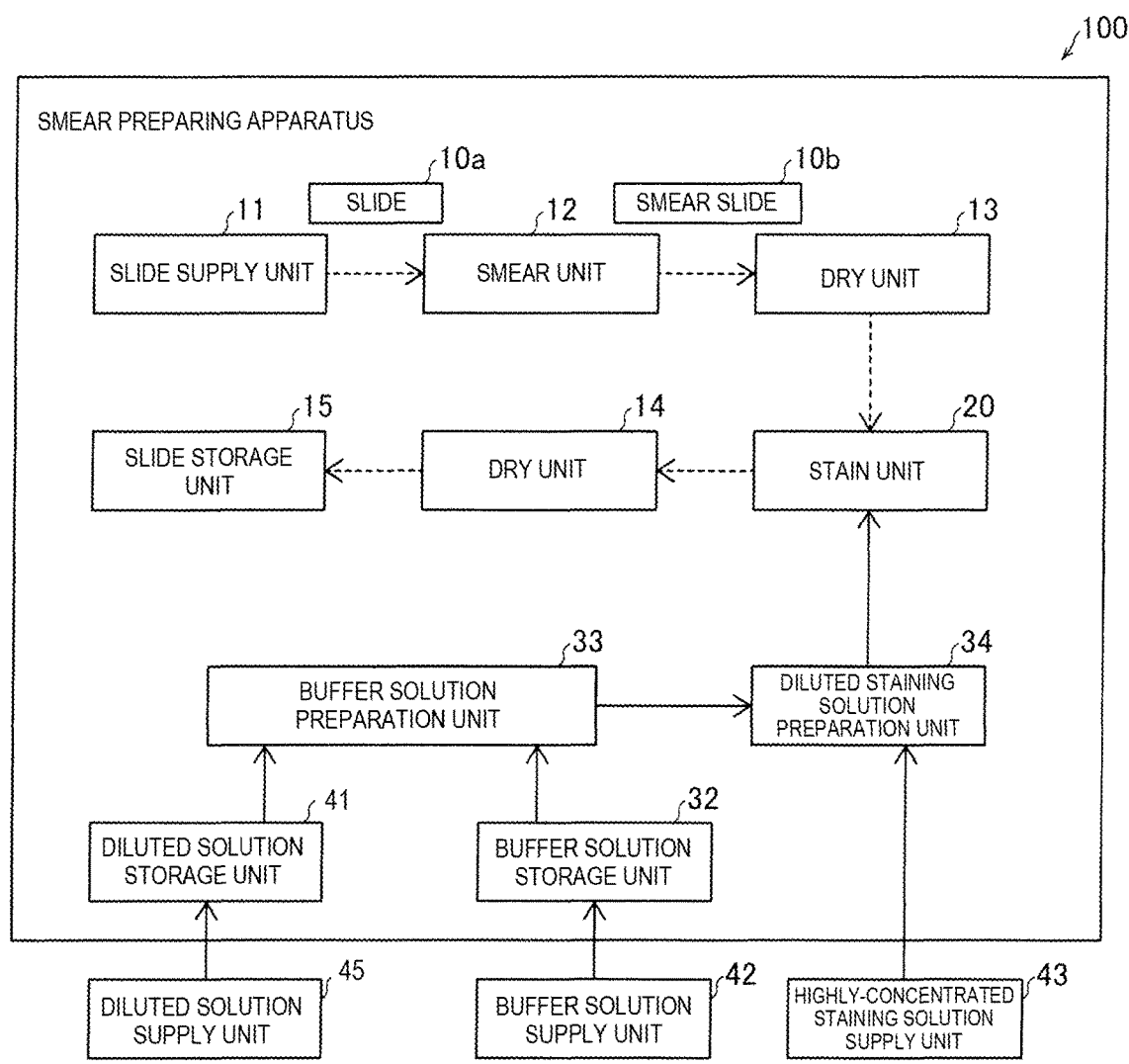
FIG. 1 is a schematic diagram illustrating an overview of a smear preparing apparatus according to an embodiment.

A smear preparing apparatus according to one or more embodiments includes: a smear unit that prepares a smear slide by smearing a sample on a slide; a buffer solution preparation unit that prepares diluted buffer solution by diluting a highly-concentrated buffer solution; a diluted staining solution preparation unit that prepares diluted staining solution by diluting a highly-concentrated staining solution with the diluted buffer solution; and a stain unit that stains the smear slide with the sample smeared thereon by the smear unit with the diluted staining solution.

In the smear preparing apparatus described above, there is provided the buffer solution preparation unit which prepares diluted buffer solution by diluting the highly-concentrated buffer solution. The diluted buffer solution is prepared by diluting the highly-concentrated buffer solution. It is possible to add a smaller weight of the highly-concentrated buffer solution which is yet to be diluted compared to the diluted buffer solution, thereby decreasing the frequency of replacing or supplying buffer solution and reduce a load on a user during the replacement. Note that the highly-concentrated buffer solution includes undiluted solution of the buffer solution, and the diluted buffer solution includes the highly-concentrated buffer solution diluted with water.

In the smear preparing apparatus described above, it may be preferable to further include a diluted solution storage unit which stores diluted solution and a buffer solution storage unit which stores the highly-concentrated buffer solution. The buffer solution preparation unit prepares the diluted buffer solution by diluting the highly-concentrated buffer solution stored in the buffer solution storage unit with the diluted solution stored in the diluted solution storage unit. Such a configuration makes it possible to prepare the diluted buffer solution by using the diluted solution stored in the diluted solution storage unit provided in the smear preparing apparatus and the highly-concentrated buffer solution stored in the buffer solution storage unit provided in the smear preparing apparatus, and thus to efficiently prepare the diluted buffer solution compared to the case of using the diluted solution and the highly-concentrated buffer solution supplied from the outside of the smear preparing apparatus. Note that the diluted solution includes tap water and highly pure water such as RO water, purified water, ion exchanged water, and distilled water.

In this case, it may be preferable to further include a cleaning unit which cleans a smear slide stained by a stain unit by using the diluted solution stored in the diluted solution storage unit. Such a configuration makes it possible to clean the smear slide by using the diluted solution applied when diluting the highly-concentrated buffer solution, and thus to simplify the apparatus configuration and reduce the number of parts compared to the case of providing a separate diluted solution supply unit.

In the smear preparing apparatus described above, it may be preferable that a diluted staining solution preparation unit includes a first diluted staining solution preparation chamber and a second diluted staining solution preparation chamber which prepare different kinds of diluted staining solutions, and the stain unit stains the smear slide with the sample smeared thereon by a smear unit with a diluted staining solution prepared by the first diluted staining solution preparation chamber, cleans the smear slide with the diluted buffer solution, stains the smear slide with a diluted staining solution prepared by the second diluted staining solution preparation chamber, and cleans the smear slide with water. Such a configuration makes it possible to use staining solutions for dilution and makes it possible for the buffer solution preparation unit to prepare and supply the diluted buffer solution also used to clean the smear slide. Hence, the staining solutions can be efficiently diluted and the smear slide can be efficiently cleaned.

In the smear preparing apparatus described above, it may be preferable to further include a housing with an interior thereof separated by a partition into an upper space and a lower space. In the upper space, the smear unit and the stain unit are provided, and in the lower space, the buffer solution preparation unit and the diluted staining solution preparation unit are provided. Such a configuration makes it possible to arrange the constituents of the apparatus in the separate upper space and lower space, and thus to prevent increase in the area for installing the apparatus. In addition, since the smear unit and the stain unit which have mechanical constituents are arranged in the upper space, the user is allowed to easily access the smear unit and the stain unit. This makes it possible to easily maintain the mechanical constituents. Furthermore, since the buffer solution preparation unit and the diluted staining solution preparation unit are arranged in the lower space, it is possible to prevent a situation where liquid in the lower space splashes on the mechanical constituents in the upper space. This makes it possible to reduce the risk of a fault due to water leakage in the mechanical configurations. What is more, since the buffer solution preparation unit and the diluted staining solution preparation unit which are intended to prepare solution are arranged, it is possible to make small a difference in height during the transfer of the solution. This makes it possible to stably make constant the amount measured by a pump while lessening the effects of a difference in hydraulic head.

In the upper space, it may be preferable that there are further provided a slide supply unit which supplies a slide, a slide transportation unit which transfers the slide, and a print unit which prints information on the slide, and in the lower space, there are further provided a diluted buffer solution storage unit which stores the diluted buffer solution and a buffer solution storage unit which stores the highly-concentrated buffer solution. Such a configuration makes it possible to easily maintain the mechanical constituents including the slide supply unit, the slide transportation unit, and the print unit in addition to the smear unit and the stain unit. Also, since there are arranged preparation units and storage units which are intended to prepare solutions including the diluted buffer solution storage unit and the buffer solution storage unit in addition to the buffer solution preparation unit and the diluted staining solution preparation unit, it is possible to prevent a situation where the liquid in the lower space splashes on the mechanical constituents in the upper space.

In the above-described configuration where the diluted solution storage unit and the buffer solution storage unit are provided, it may be preferable that the buffer solution storage unit be capable of storing the highly-concentrated buffer solution or a prepared diluted buffer solution, and if the prepared diluted buffer solution is stored in the buffer solution storage unit, the buffer solution preparation unit supply the prepared diluted buffer solution without dilution. Such a configuration makes it possible to supply the diluted buffer solution using a diluted buffer solution tank even when water for diluting the highly-concentrated buffer solution cannot be supplied. Hence, smears can be prepared.

It may be preferable that the buffer solution preparation unit is configured to switch between a first operation of mixing the diluted solution stored in the diluted solution storage unit and the highly-concentrated buffer solution stored in the buffer solution storage unit, and a second operation of supplying the prepared diluted buffer solution without dilution. Such a configuration makes it possible to easily switch between the case of preparing the diluted buffer solution with use of the highly-concentrated buffer solution and the case of directly supplying the diluted buffer solution, which allows efficient application in consideration of the time for diluting the highly-concentrated buffer solution to prepare the diluted buffer solution. This enables application that matches the user's specifications.

In the above-described configuration where the diluted solution storage unit and the buffer solution storage unit are provided, it may be preferable that the diluted solution storage unit includes an introduction part which introduces the diluted solution and a water amount detector which detects an amount of the diluted solution stored, and if the water amount detector detects that the amount of the diluted solution stored in the diluted solution storage unit is equal to or less than a predetermined amount, the diluted solution is supplied via the introduction part to the diluted solution storage unit. Such a configuration makes it possible to automatically supply the diluted solution to the diluted solution storage unit even when the diluted solution in the diluted solution storage unit has reduced to a small amount.

In the above-described configuration where the buffer solution storage unit can store the highly-concentrated buffer solution or the prepared diluted buffer solution, it may be preferable to further include a mount table on which the apparatus is mounted and which includes a storage section. The storage section can house a highly-concentrated buffer solution container containing the highly-concentrated buffer solution and a diluted solution container containing the diluted solution, or a diluted buffer solution containing the prepared diluted buffer solution. Such a configuration makes it possible to house in the mount table the highly-concentrated buffer solution container and a water container when the diluted buffer solution is to be prepared with use of the highly-concentrated buffer solution, and to house in the mount table the diluted buffer solution container when the diluted buffer solution is to be directly supplied.

In the smear preparing apparatus described above, if an error occurs or a shutdown process is executed during preparation of the diluted buffer solution by the buffer solution preparation unit, it may be preferable that the buffer solution preparation unit discharges liquid being prepared to an outside. Such a configuration makes it possible to prevent use of the buffer solution prepared at a concentration different from the target concentration.

In the smear preparing apparatus described above, it may be preferable that the stain unit is cleaned with cleaning liquid containing methanol and the diluted buffer solution. Such a configuration makes it possible to effectively clean the stain unit thanks to the cleaning effects of methanol. Moreover, since the cleaning liquid is prepared by mixing the buffer solution in methanol, the amount of methanol used can be reduced.

In the smear preparing apparatus described above, it may be preferable that the stain unit includes a stain bath which includes a hold section capable of holding the smear slides, a liquid introduction part which introduces liquid to an inside, and a liquid discharge part which discharges the liquid to an outside, and while holding the smear slides on the hold section, the stain unit stains the samples smeared on the smear slides by introducing the diluted staining solution from the liquid introduction part to the stain bath. Such a configuration makes it possible to efficiently prepare the smears because the smear slides can be stained at the same time.

It may be preferable that the stain unit includes a methanol bath, the stain baths, and a cleaning bath, and the stain unit fixes a smear with methanol in the methanol bath, fixes the smear with the highly-concentrated staining solution in a first one of the stain baths, stains the smear with the diluted staining solution in a second one of the stain baths, cleans the smear with the diluted buffer solution in the cleaning bath, stains the smear with the diluted staining solution in a three and a four one of the stain baths, and cleans the smear with water.

In the smear preparing apparatus described above, it may be preferable that the buffer solution includes a phosphate buffer solution. Such a configuration makes it possible to decrease the frequency of replacing or supplying the phosphate buffer solution and reduce a load on a user during the replacement in the smear preparing apparatus which uses the phosphate buffer solution.

In the smear preparing apparatus described above, it may be preferable that the staining solution includes at least one of May-Grünwald solution, Giemsa solution, and Wright solution. Such a configuration makes it possible to clearly stain the smear slide with use of at least one of the May-Grünwald solution, the Giemsa solution, and the Wright solution.

In the smear preparing apparatus described above, it may be preferable that the sample is blood. Such a configuration makes it possible to decrease the frequency of replacing or supplying the buffer solution and reduce a load on a user during the replacement in the smear preparing apparatus which prepares a smear of blood.

In the smear preparing apparatus described above, it may be preferable that the buffer solution preparation unit is cleaned using the diluted buffer solution. Such a configuration makes it possible to prevent a situation where the concentration of the buffer solution to be prepared becomes lower than the target concentration unlike the case of cleaning the buffer solution preparation unit with water.

In the smear preparing apparatus described above, it may be preferable to further include a sensor which measures a characteristic of the diluted buffer solution prepared by the buffer solution preparation unit. When the sensor measures the characteristic and if the characteristic is out of a predetermined range, the diluted buffer solution of the buffer solution preparation unit is discharged to the outside. Such a configuration makes it possible to prevent use of the buffer solution prepared at a concentration different from the target concentration.

A smear preparing method according to one or more embodiments, includes: preparing a smear slide by smearing a sample on a slide; preparing a diluted buffer solution by diluting a highly-concentrated buffer solution; preparing a diluted staining solution by diluting a highly-concentrated staining solution with the diluted buffer solution; and staining the smear slide with the sample smeared thereon by using the diluted staining solution.

In the smear preparing method described above, the diluted buffer solution is prepared by diluting the highly-concentrated buffer solution. Since the diluted buffer solution is prepared by diluting the highly-concentrated buffer solution, by adding the highly-concentrated buffer solution which is yet to be diluted and has a smaller weight compared to the diluted buffer solution, it is possible to decrease the frequency of replacing or supplying buffer solution and reduce a load on a user during the replacement.

According to the embodiments described above, it is possible to decrease the frequency of replacing or supplying buffer solution and reduce a load on a user during the replacement.

Hereinafter, embodiments are described with the drawings.

[Overview of Smear Preparing Apparatus]

With reference to FIG. 1, an overview of smear preparing apparatus 100 according to embodiments are described.

Smear preparing apparatus 100 is an apparatus for automatically preparing a smear by performing a smearing process of smearing a sample on slide 10a to prepare smear slide 10b, and by performing a staining process on smear slide 10b having the sample smeared thereon. The sample is, for example, blood.

As illustrated in FIG. 1, smear preparing apparatus 100 includes slide supply unit 11, smear unit 12, dry unit 13, dry unit 14, and slide storage unit 15. In addition, smear preparing apparatus 100 includes stain unit 20, buffer solution storage unit 32, buffer solution preparation unit 33, diluted staining solution preparation unit 34, and diluted solution storage unit 41. Furthermore, diluted solution supply unit 45, buffer solution supply unit 42, and highly-concentrated staining solution supply unit 43 are connected to smear preparing apparatus 100.

Slide supply unit 11 supplies slides 10a before smearing (before processing) one by one. Also, slide supply unit 11 can house slides 10a. Slide supply unit 11 passes slides 10a one by one to a slide transportation unit.

Smear unit 12 smears a sample on a slide held by the slide transportation unit, and performs a smearing process of preparing smear slide 10b.

Dry unit 13 is configured to receive smear slide 10b having the sample smeared thereon from the slide transportation unit, and to dry the sample of smear slide 10b. Dry unit 13 passes dried smear slide 10b to stain unit 20.

Dry unit 14 is configured to dry smear slide 10b stained by stain unit 20. Dry unit 14 passes dried smear slide 10b to slide storage unit 15.

Slide storage unit 15 is configured to store stained smear slide 10b.

Stain unit 20 performs a staining process on the sample of smear slide 10b having undergone the smearing process by smear unit 12. Stain unit 20 stains smear slide 10b smeared by smear unit 12 with use of a diluted staining solution prepared by diluted staining solution preparation unit 34.

Stain unit 20 performs a staining process in a stain bath and a cleaning process in a cleaning bath on smeared smear slide 10b dried by dry unit 13.

Buffer solution storage unit 32 stores a highly-concentrated buffer solution supplied from buffer solution supply unit 42. The buffer solution is, for example, a phosphate buffer solution. The buffer solution is prepared by mixing sodium dihydrogen phosphate and disodium hydrogen phosphate.

Buffer solution preparation unit 33 mixes diluted solution or water stored in diluted solution storage unit 41 and the highly-concentrated buffer solution stored in buffer solution storage unit 32 at a predetermined ratio to prepare a diluted buffer solution. For example, buffer solution preparation unit 33 dilutes a highly-concentrated buffer solution with a 1:55 ratio by water. An amount of water measured by a diaphragm pump is supplied from diluted solution storage unit 41 to buffer solution preparation unit 33. In addition, an amount of highly-concentrated buffer solution measured by a diaphragm pump is supplied from buffer solution storage unit 32 to buffer solution preparation unit 33. To be more specific, an amount of highly-concentrated buffer solution measured by a diaphragm pump is supplied once to buffer solution preparation unit 33, and an amount of water measured by another diaphragm pump is supplied 54 times to buffer solution preparation unit 33. Note that the ratio at which the buffer solution is diluted may be other than 55.

Diluted staining solution preparation unit 34 mixes a highly-concentrated staining solution supplied from highly-concentrated staining solution supply unit 43 and the diluted buffer solution prepared by buffer solution preparation unit 33 at a predetermined ratio to prepare a diluted staining solution. For example, the staining solution contains at least one of a May-Grünwald solution, a Giemsa solution, and a Wright solution. To be more specific, in the case of performing May-Giemsa staining, the staining solution contains a May-Grünwald solution and a Giemsa solution. In the case of performing Wright-Giemsa staining, the staining solution contains a Wright solution and a Giemsa solution. In the case of performing simple Wright staining, the staining solution contains a Wright solution. Diluted staining solution preparation unit 34 is supplied with an amount of highly-concentrated staining solution measured by a diaphragm pump. Additionally, diluted staining solution preparation unit 34 is supplied with an amount of diluted buffer solution measured by a diaphragm pump.

Diluted solution storage unit 41 stores diluted solution or water supplied from diluted solution supply unit 45 or from water supply unit 46. The diluted solution or the water supplied from diluted solution supply unit 45 or from water supply unit 46 is, for example, RO (Reverse Osmosis) water. Note that the diluted solution or the water supplied from diluted solution supply unit 45 or from water supply unit 46 may be highly pure water such as purified water, ion exchanged water, and distilled water, or may be tap water.

As in the foregoing configuration, buffer solution preparation unit 33 is provided which dilutes a highly-concentrated buffer solution to prepare a diluted buffer solution. A diluted buffer solution is prepared by diluting a highly-concentrated buffer solution as mentioned above. Thus, by adding a highly-concentrated buffer solution which is yet to be diluted and has a smaller weight compared to the diluted buffer solution, a user does not need to add a diluted buffer solution. As a result, it is possible to decrease the frequency of replacing or supplying buffer solution and reduce a load on a user during the replacement.

[Detailed Configuration of Smear Preparing Apparatus]

Hereinafter, with reference to FIG. 2 and the subsequent drawings, a configuration of embodiments of smear preparing apparatus 100 illustrated in FIG. 1 is described in detail.

Figure 2:
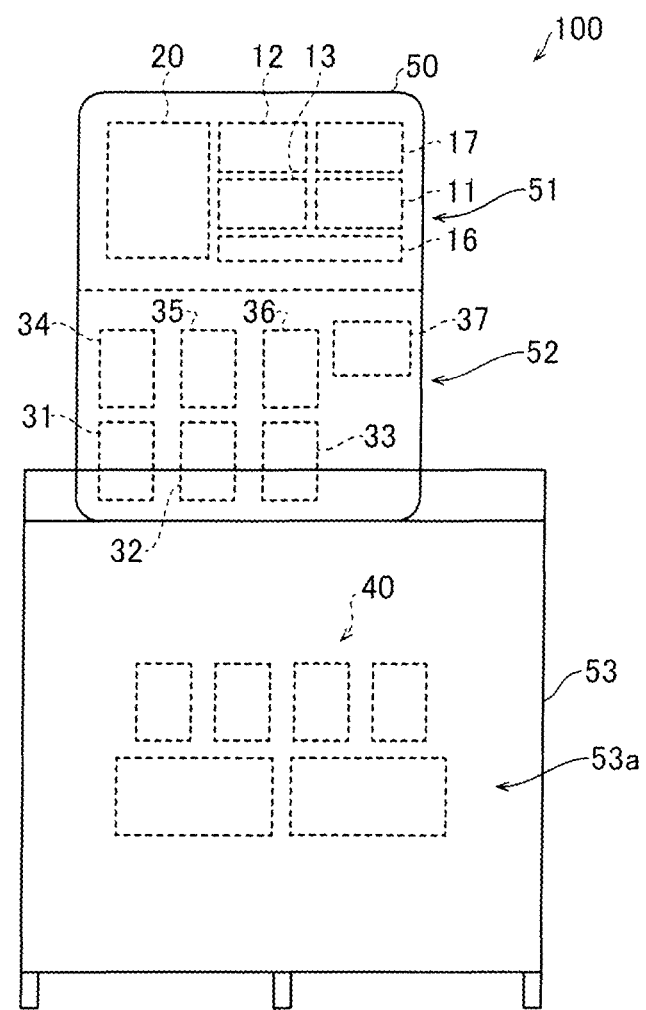
FIG. 2 is a front view illustrating the overview of the smear preparing apparatus according to an embodiment.

As illustrated in FIG. 2, smear preparing apparatus 100 includes housing 50. The interior of housing 50 is divided into upper space 51 and lower space 52. Arranged in upper space 51 are slide supply unit 11, smear unit 12, dry unit 13, slide transportation unit 16, print unit 17, and stain unit 20. Arranged in lower space 52 are controller 31, buffer solution storage unit 32, buffer solution preparation unit 33, diluted staining solution preparation unit 34, diluted buffer solution storage unit 35, and staining solution storage unit 36. In addition, smear preparing apparatus 100, housing 50, or a main body of smear preparing apparatus 100 is mounted on mount table 53. Storage section 53a is provided in or at mount table 53. Containers 40 containing water and reagent therein are arranged in storage section 53a of mount table 53. Arranged in lower space 52 are buffer solution storage unit 32, buffer solution preparation unit 33, diluted staining solution preparation unit 34, diluted buffer solution storage unit 35, and staining solution storage unit 36, which are intended to prepare a solution. Thus, it is possible to make a difference small in height during the transfer of the solution. This makes it possible to stably make the amount constant measured by a pump while lessening the effects of a difference in hydraulic head. Additionally, a solenoid valve and a diaphragm pump which prepare a reagent are arranged in close proximity to a highly-concentrated reagent storage unit and a storage unit for preparation. This enables the user to easily check operation. Furthermore, it is possible to prevent inaccurate dilution unlike the case where the highly-concentrated reagent storage unit, the diaphragm pump, and the storage unit for preparation are distant from one another.

Figure 3:
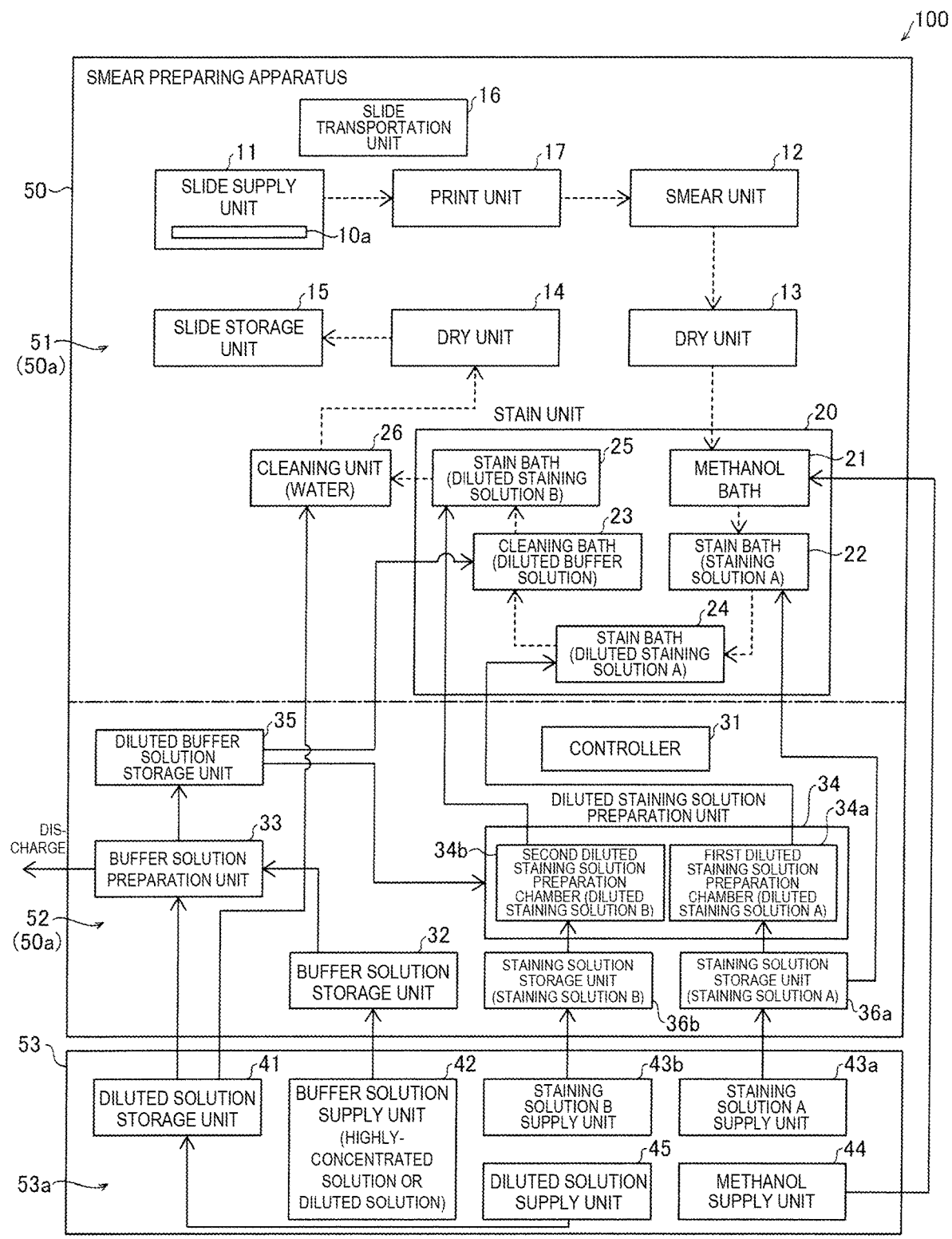
FIG. 3 is a diagram for explaining an overall configuration of the smear preparing apparatus according to an embodiment.

In detail, smear preparing apparatus 100 includes slide supply unit 11, smear unit 12, dry unit 13, dry unit 14, slide storage unit 15, slide transportation unit 16, and print unit 17, as illustrated in FIG. 3. In addition, smear preparing apparatus 100 includes: stain unit 20 which contains methanol bath 21, stain bath 22, cleaning bath 23, and stain baths 24 and 25; and cleaning unit 26. Furthermore, smear preparing apparatus 100 includes: buffer solution storage unit 32; buffer solution preparation unit 33; diluted staining solution preparation unit 34 which contains first diluted staining solution preparation chamber 34a and second diluted staining solution preparation chamber 34b; diluted buffer solution storage unit 35; and staining solution storage units 36a and 36b.

Smear preparing apparatus 100 includes controller 31 which contains a computer including a central processing unit (CPU) and memories. In addition, diluted solution storage unit 41, buffer solution supply unit 42, highly-concentrated staining solution A supply unit 43a, highly-concentrated staining solution B supply unit 43b, methanol supply unit 44, and diluted solution supply unit 45 are connected to smear preparing apparatus 100. Smear preparing apparatus 100 includes; housing 50; and housing interior space 50a which contains upper space 51 and lower space 52. Upper space 51a and lower space 51b of housing interior space 50a are partitioned by a floor plate or a partition. What is more, smear preparing apparatus 100 includes mount table 53 for mounting the apparatus itself, housing 50, or a main body of smear preparing apparatus 100.

Slide supply unit 11, smear unit 12, dry unit 13, dry unit 14, slide storage unit 15, slide transportation unit 16, print unit 17, stain unit 20, and cleaning unit 26 are arranged in upper space 51 of housing interior space 50a. Controller 31, buffer solution storage unit 32, buffer solution preparation unit 33, diluted staining solution preparation unit 34, diluted buffer solution storage unit 35, and staining solution storage units 36a and 36b are arranged in lower space 52 of housing interior space 50a. Diluted solution storage unit 41, buffer solution supply unit 42, highly-concentrated staining solution A supply unit 43a, highly-concentrated staining solution B supply unit 43b, methanol supply unit 44, and diluted solution supply unit 45 are housed in storage section 53a of mount table 53. Here, upper space 51 has only to include at least smear unit 12 and stain unit 20. On the other hand, lower space 52 has only to include at least buffer solution preparation unit 33 and diluted staining solution preparation unit 34. This makes it possible to prevent increase in the area for installing the apparatus because the constituents of the apparatus can be arranged in separate upper space 51 and lower space 52. In addition, since smear unit 12, stain unit 20, and slide transportation unit 16 which have mechanical constituents are arranged in upper space 51, the user is allowed to easily access smear unit 12, stain unit 20, and slide transportation unit 16. This makes it possible to easily maintain the mechanical constituents. Furthermore, storage section 53a of mount table 53 houses at least a highly-concentrated buffer solution container containing highly-concentrated buffer solution and a water container containing water, or a diluted buffer solution container containing a diluted buffer solution.

Slide transportation unit 16 receives one slide 10a from slide supply unit 11. Slide transportation unit 16 next transfers received slide 10a. To be more specific, slide transportation unit 16 transfers received slide 10a while holding slide 10a on an upper surface of slide transportation unit 16. Subsequently, slide transportation unit 16 holds slide 10a with a hold section. Moreover, slide transportation unit 16 transfers held slide 10a to print unit 17, smear unit 12, and dry unit 13.

Print unit 17 prints various types of information such as sample information on a print region of slide 10a. What is more, print unit 17 prints on slide 10a being held on the upper surface of slide transportation unit 16.

Stain unit 20 stains one after another smear slides 10b smeared by smear unit 12 with different diluted staining solutions. Also, stain unit 20 cleans smear slides 10b with a diluted buffer solution while staining one after another smear slides 10b with different diluted staining solutions. Here, stain baths 22, 24 and 25 of stain unit 20 are cleaned with cleaning liquid containing methanol and a diluted buffer solution. Thus, it is possible to effectively clean the stain units thanks to the cleaning effects of methanol. The cleaning liquid is prepared by mixing a buffer solution in methanol. For this reason, it is possible to reduce the amount of methanol to be used.

Methanol bath 21 can store methanol. Methanol bath 21 is supplied with methanol from methanol supply unit 44. In addition, in methanol bath 21, the sample of smear slide 10b having undergone the smearing process is fixed. To be more specific, in methanol bath 21, water in the sample is substituted with methanol.

Figure 4:
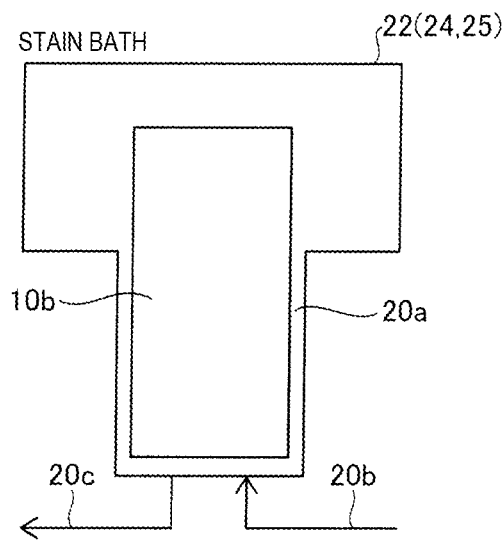
FIG. 4 is a front view for explaining a stain bath of the smear preparing apparatus according to an embodiment.

Stain baths 22, 24, and 25 each include: hold section 20a which can hold smear slides 10b (see FIG. 4); liquid introduction part 20b which introduces a liquid to the inside (see FIG. 4); and liquid discharge part 20c which discharges a liquid to the outside (see FIG. 4). Hold section 20a holds smear slides 10b at predetermined intervals (see FIG. 5) with its longitudinal direction in the up-down direction. While smear slides 10b are held by hold section 20a, stain baths 24 and 25 introduce a diluted staining solution from liquid introduction part 20b to the stain baths, thereby staining the samples smeared on smear slide 10b. This makes it possible to efficiently prepare smears because smear slides 10b can be stained at the same time.

As illustrated in FIG. 3, stain bath 22 can store highly-concentrated staining solution A. Stain bath 22 is supplied with highly-concentrated staining solution A from staining solution storage unit 36a. In addition, in stain bath 22, the target smear is fixed by highly-concentrated staining solution A. For example, in the case of performing May-Giemsa staining, a highly-concentrated May-Grünwald solution is used in stain bath 22. In the case of performing Wright-Giemsa staining, a highly-concentrated Wright solution is used in stain bath 22. In the case of performing simple Wright staining, a highly-concentrated Wright solution is used in stain bath 22.

Cleaning bath 23 can store a diluted buffer solution. Cleaning bath 23 is supplied with a diluted buffer solution from diluted buffer solution storage unit 35. Also, in cleaning bath 23, stained smear slides 10b are cleaned by the diluted buffer solution.

Stain bath 24 can store diluted staining solution A. Stain bath 24 is supplied with diluted staining solution A from first diluted staining solution preparation chamber 34a. In addition, in stain bath 24, cytoplasm is stained. For example, in the case of performing May-Giemsa staining, a May-Grünwald solution diluted with a phosphate buffer solution is used in stain bath 24. In the case of performing Wright-Giemsa staining, a highly-concentrated Wright solution diluted with a phosphate buffer solution is used in stain bath 24. In the case of performing simple Wright staining, a highly-concentrated Wright solution diluted with a phosphate buffer solution is used in stain bath 24.

Stain bath 25 can store diluted staining solution B. Stain bath 25 is supplied with diluted staining solution B from second diluted staining solution preparation chamber 34b. In addition, in stain bath 25, nuclei are stained. For example, in the case of performing May-Giemsa staining, a Giemsa solution diluted with a phosphate buffer solution is used in stain bath 25. In the case of performing Wright-Giemsa staining, a Giemsa solution diluted with a phosphate buffer solution is used in stain bath 25.

Cleaning unit 26 can store water. Cleaning unit 26 is supplied with water from diluted solution storage unit 41. Stained smear slides 10b are cleaned in cleaning unit 26. This configuration makes it possible to clean smear slides 10b with water to be used for diluting a highly-concentrated buffer solution. Thus, the apparatus configuration can be simplified and the number of parts can be reduced compared to the case of providing a separate water supply unit.

Figure 6:
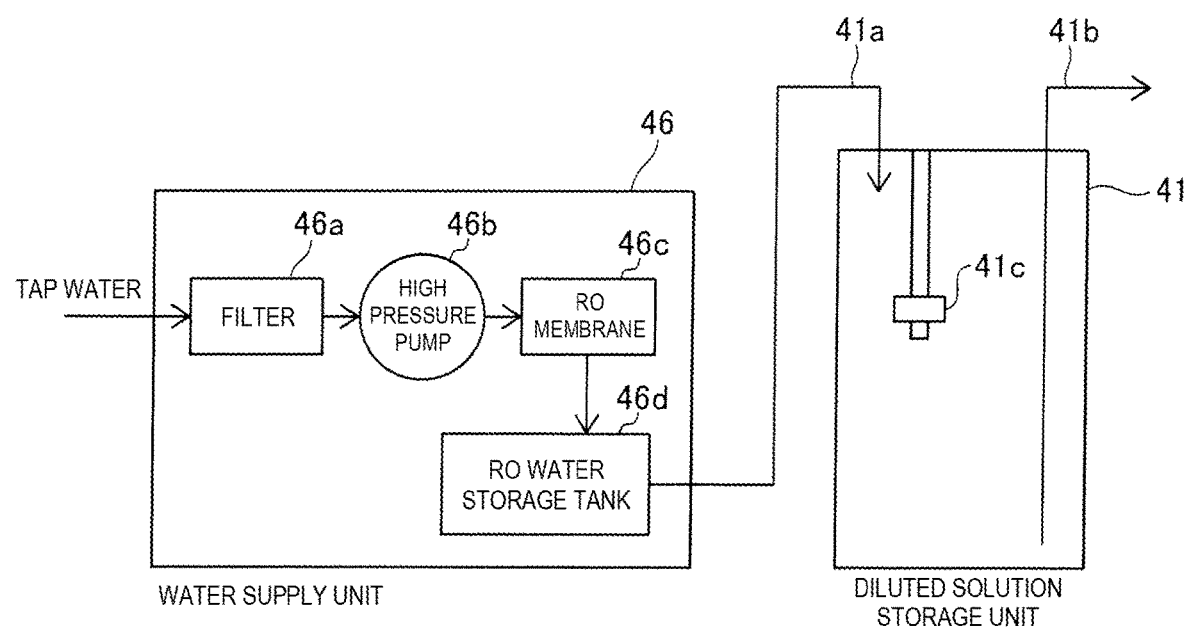
FIG. 6 is a diagram for explaining a water supply unit and a diluted solution storage unit of the smear preparing apparatus according to the embodiment.

Diluted solution storage unit 41 includes; introduction part 41a which introduces diluted solution or water from diluted solution supply unit 45 or from water supply unit 46 (see FIG. 6); supply section 41b which supplies water (see FIG. 6); and water amount detector 41c or a diluted solution amount detector which detects the amount of water stored (see FIG. 6). When water amount detector 41c detects that the amount of water stored in diluted solution storage unit 41 is equal to or less than a predetermined amount, water is supplied from water supply unit 46 via introduction part 41a to diluted solution storage unit 41. Thus, it is possible to automatically supply water to diluted solution storage unit 41 even when the water in diluted solution storage unit 41 has reduced to a small amount.

Buffer solution storage unit 32 can store a diluted buffer solution in place of the highly-concentrated buffer solution. In other words, the diluted buffer solution may be supplied from buffer solution supply unit 42. In this case, a container filled with the diluted buffer solution is arranged in buffer solution supply unit 42. Buffer solution preparation unit 33 does not mix water stored in diluted solution storage unit 41 in the case where the diluted buffer solution is stored in buffer solution storage unit 32. In other words, buffer solution preparation unit 33 can switch between a first operation of mixing water stored in diluted solution storage unit 41 and a second operation of not mixing water. Thanks to this configuration, it is possible to supply the diluted buffer solution with use of a container of the diluted buffer solution even when water for diluting the highly-concentrated buffer solution cannot be supplied. Thus, smears can be prepared. Moreover, since it is possible to easily switch between the case of preparing the diluted buffer solution with user of the highly-concentrated buffer solution and the case of directly supplying the diluted buffer solution, efficient application can be achieved in consideration of the time for diluting the highly-concentrated buffer solution to prepare the diluted buffer solution, which enables application that matches the user's preference or demand. Furthermore, by reading a barcode provided on the container, determination may be made as to whether or not the highly-concentrated buffer solution is in buffer solution supply unit 42 or the diluted buffer solution is in buffer solution supply unit 42.

With regard to buffer solution preparation unit 33, when an error occurs or a shutdown process is executed during the preparation of the diluted buffer solution, buffer solution preparation unit 33 discharges liquid being prepared to the outside. This makes it possible to prevent use of the buffer solution prepared at a concentration different from the target concentration. Note that buffer solution preparation unit 33 may be cleaned with use of the diluted buffer solution or with use of water. Incidentally, a sensor may be provided which measures the characteristics of the diluted buffer solution prepared by buffer solution preparation unit 33. The sensor may measure, for example, pH. What is more, when a characteristic measured by the sensor is out of a predetermined range, the diluted buffer solution of buffer solution preparation unit 33 may be discharged to the outside.

Diluted staining solution preparation unit 34 prepares two or more kinds of diluted staining solutions. For example, diluted staining solution preparation unit 34 prepares diluted staining solution A at first diluted staining solution preparation chamber 34a. Meanwhile, diluted staining solution preparation unit 34 prepares diluted staining solution B at second diluted staining solution preparation chamber 34b. This makes it possible to supply the diluted buffer solution prepared by buffer solution preparation unit 33, the diluted buffer solution being used to dilute staining solutions and to clean smear slides 10b. Thus, it is possible to efficiently dilute staining solutions and to efficiently clean smear slides 10b. First diluted staining solution preparation chamber 34a stores diluted staining solution A prepared by diluted staining solution preparation unit 34. Second diluted staining solution preparation chamber 34b stores diluted staining solution B prepared by diluted staining solution preparation unit 34. Thanks to this configuration, the diluted staining solutions prepared with use of the diluted buffer solution can be stored in the apparatus, which makes it possible to promptly supply the diluted staining solutions.

Diluted buffer solution storage unit 35 can store the diluted buffer solution. Diluted buffer solution storage unit 35 is supplied with the diluted buffer solution from buffer solution preparation unit 33. Diluted buffer solution storage unit 35 can store twice the amount of diluted buffer solution prepared at one operation by buffer solution preparation unit 33. Diluted buffer solution storage unit 35 includes a two-stage water level detector. When the diluted buffer solution is below an upper water level detector, cleaning of the smears is enabled, but dilution of the staining solutions is disabled. In addition, the diluted buffer solution is supplied from buffer solution preparation unit 33 to diluted buffer solution storage unit 35. When the diluted buffer solution is below a lower water level detector, neither the cleaning of the smears nor the dilution of the staining solutions is enabled.

Staining solution storage unit 36a can store highly-concentrated staining solution A. Staining solution storage unit 36a is supplied with highly-concentrated staining solution A from highly-concentrated staining solution A supply unit 43a. Staining solution storage unit 36b can store highly-concentrated staining solution B. Staining solution storage unit 36b is supplied with highly-concentrated staining solution B from highly-concentrated staining solution B supply unit 43b.

Controller 31 controls the units of smear preparing apparatus 100, thereby smearing samples on slides 10a to prepare smear slides 10b and then performing the staining process on smear slides 10b with smeared samples, thereby preparing smears.

Figure 5:
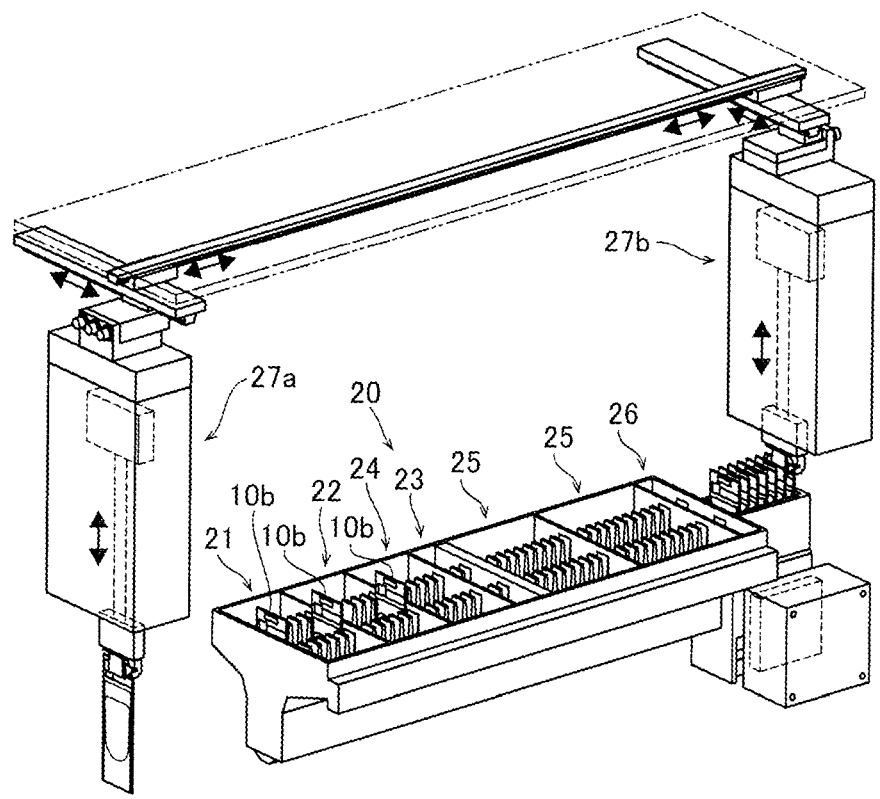
FIG. 5 is a perspective view for explaining the stain bath of the smear preparing apparatus according to an embodiment.

As illustrated in FIG. 5, stain unit 20 integrally includes layers. For example, stain unit 20 integrally includes methanol bath 21, stain bath 22, cleaning bath 23, stain bath 24, and two stain baths 25. Additionally, stain unit 20 integrally includes cleaning unit 26. Moreover, provided above stain unit 20 is transfer unit 27a which transfers smear slides 10b to the baths of stain unit 20. Transfer unit 27a can move to a position above each of methanol bath 21, stain bath 22, stain bath 24, and cleaning bath 23. Thus, transfer unit 27a can insert and pull smear slides 10b one by one to and from hold section 20a of each of methanol bath 21, stain bath 22, stain bath 24, and cleaning bath 23.

Furthermore, provided above stain unit 20 is transfer unit 27b which transfers smear slides 10b to the baths of stain unit 20 and to cleaning unit 26. Transfer unit 27b can move to a position above each of cleaning bath 23, two stain baths 25, and cleaning unit 26, to a position above dry unit 14, and to a position for transferring to slide storage unit 15. Thus, transfer unit 27b can insert and pull smear slides 10b one by one to and from hold section 20a of each of cleaning bath 23, two stain baths 25, and cleaning unit 26.

Transfer unit 27a and transfer unit 27b can transfer different smear slides 10b in parallel. Transfer units 27a and 27b have overlapping operating regions above cleaning bath 23. Smear slides 10b are passed at cleaning bath 23 from transfer unit 27a to transfer unit 27b or from transfer unit 27b to transfer unit 27a. In other words, smear slides 10b are transferred between transfer unit 27a and transfer unit 27b via cleaning bath 23. The position of the passing over of smear slides 10b between transfer units 27a and 27b may be other than at cleaning bath 23.

As illustrated in FIG. 6, water supply unit 46 produces and supplies, for example, RO water. In the case of the example illustrated in FIG. 6, water supply unit 46 produces RO water from tap water. In addition, water supply unit 46 includes filter 46a, high pressure pump 46b, RO membrane 46c, and RO water storage tank 46d. Filter 46a removes foreign matter such as contaminants. High pressure pump 46b increases the pressure of tap water applied to RO membrane 46c. RO membrane 46c produces RO water by reverse osmosis pressure. RO water storage tank 46d stores the produced RO water.

Back to FIG. 3, highly-concentrated staining solution supply unit 43 includes highly-concentrated staining solution A supply unit 43a and highly-concentrated staining solution B supply unit 43b. Arranged in highly-concentrated staining solution A supply unit 43a is a container filled with highly-concentrated staining solution A. Arranged in highly-concentrated staining solution B supply unit 43b is a container filled with highly-concentrated staining solution B. The containers filled with highly-concentrated staining solution A and the containers filled with highly-concentrated staining solution A are replaceable.

Methanol supply unit 44 supplies methanol. Arranged in methanol supply unit 44 is a container filled with methanol. The container filled with methanol is replaceable.

Diluted solution supply unit 45 supplies diluted solution. Arranged in diluted solution supply unit 45 is a container filled with diluted solution. The container filled with diluted solution is replaceable. The diluted solution is, for example, DCL.

(Fluid Circuit of Smear Preparing Apparatus)

Figure 7:
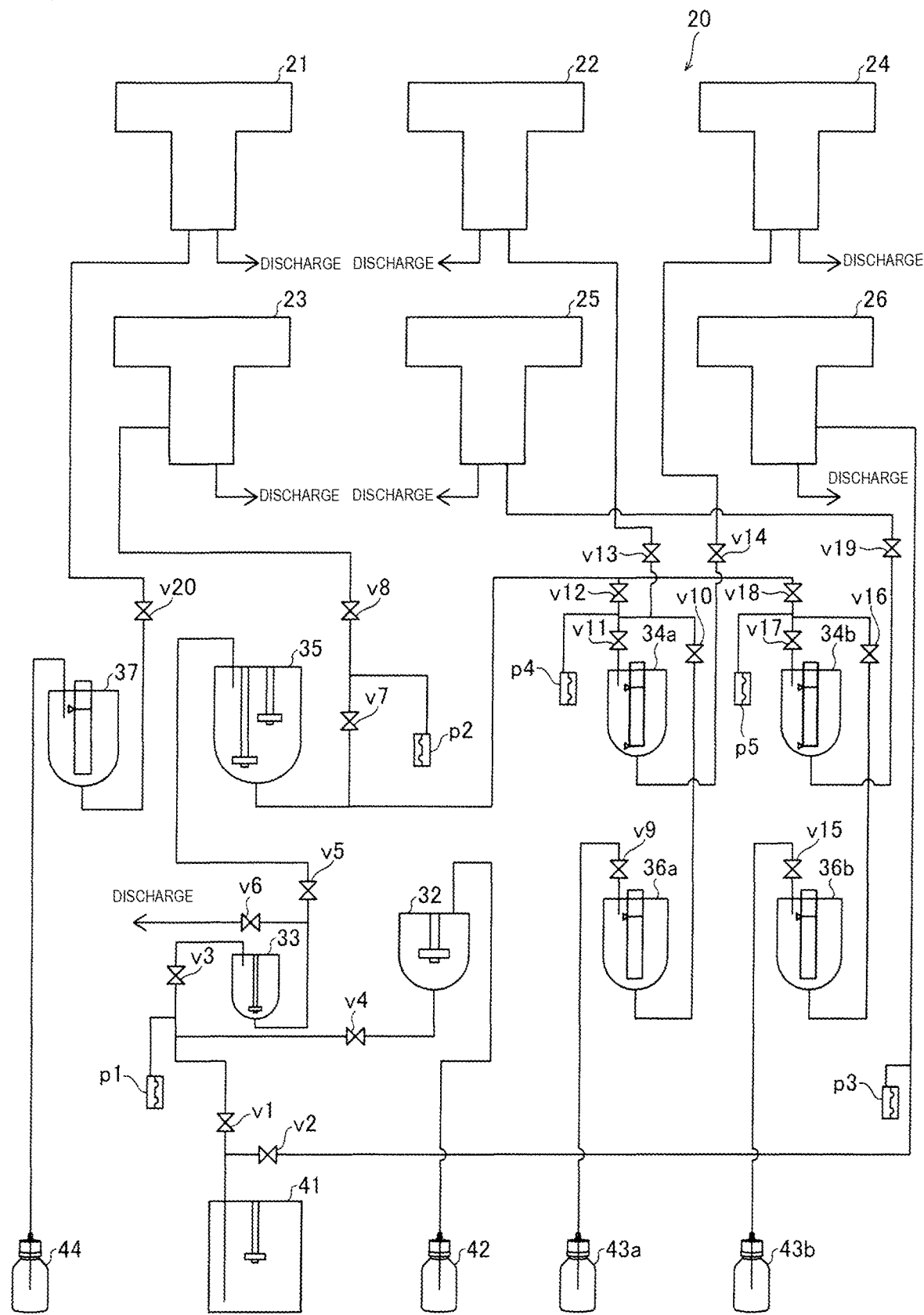
FIG. 7 is a diagram illustrating an overview of a fluid circuit diagram of the smear preparing apparatus according to an embodiment.

With reference to FIG. 7, an overview of a fluid circuit of smear preparing apparatus 100 is described.

The Fluid circuit illustrated in FIG. 7 includes: methanol bath 21; stain bath 22; cleaning bath 23; stain bath 24; stain bath 25; cleaning unit 26; buffer solution storage unit 32; buffer solution preparation unit 33; first diluted staining solution preparation chamber 34a; second diluted staining solution preparation chamber 34b; diluted buffer solution storage unit 35; staining solution storage units 36a and 36b; methanol storage unit 37; diluted solution storage unit 41; buffer solution supply unit 42; highly-concentrated staining solution A supply unit 43a; highly-concentrated staining solution B supply unit 43b; methanol supply unit 44; valves v1, v2, v3, v4, v5, v6, v7, v8, v9, v10, v11, v12, v13, v14, v15, v16, v17, v18, v19, and v20; and diaphragm pumps p1, p2, p3, p4, and p5.

When water as a diluted solution is to be supplied from diluted solution storage unit 41 to buffer solution preparation unit 33, valves v1 and v3 are opened. Then, an amount of water measured by diaphragm pump p1 is supplied from diluted solution storage unit 41 to buffer solution preparation unit 33. When water as cleaning water is to be supplied from diluted solution storage unit 41 to cleaning unit 26, valve v2 is opened. Then, water pressurized by diaphragm pump p3 is supplied from diluted solution storage unit 41 to cleaning unit 26.

When an undiluted solution of buffer solution is to be supplied from buffer solution supply unit 42 to buffer solution storage unit 32, buffer solution storage unit 32 is connected to a negative pressure. As a result, the undiluted solution of the buffer solution is sucked and moved from buffer solution supply unit 42 to buffer solution storage unit 32.

When an undiluted solution of staining solution A is to be supplied from highly-concentrated staining solution A supply unit 43a to staining solution storage unit 36a, valve v9 is opened and staining solution storage unit 36a is connected to a negative pressure. As a result, the undiluted solution of staining solution A is sucked and moved from highly-concentrated staining solution A supply unit 43a to staining solution storage unit 36a. When an undiluted solution of staining solution B is to be supplied from highly-concentrated staining solution B supply unit 43b to staining solution storage unit 36b, valve v15 is opened and staining solution storage unit 36b is connected to a negative pressure. As a result, the undiluted solution of staining solution B is sucked and moved from highly-concentrated staining solution B supply unit 43b to staining solution storage unit 36b.

When an undiluted solution of buffer solution is to be supplied from buffer solution storage unit 32 to buffer solution preparation unit 33, valves v3 and v4 are opened. Then, an amount of the undiluted solution of the buffer solution measured by diaphragm pump p1 is supplied from buffer solution storage unit 32 to buffer solution preparation unit 33.

When the diluted buffer solution is to be supplied from buffer solution preparation unit 33 to diluted buffer solution storage unit 35, valve v5 is opened and buffer solution preparation unit 33 is connected to a positive pressure. As a result, the diluted buffer solution is pushed out and moved from buffer solution preparation unit 33 to diluted buffer solution storage unit 35. When the buffer solution is to be discharged from buffer solution preparation unit 33, valve v6 is opened and buffer solution preparation unit 33 is connected to a positive pressure. As a result, the buffer solution is pushed out and discharged from buffer solution preparation unit 33.

When the diluted buffer solution is to be supplied from diluted buffer solution storage unit 35 to cleaning bath 23, valves v7 and v8 are opened. Then, the diluted buffer solution pressurized by diaphragm pump p2 is supplied from diluted buffer solution storage unit 35 to cleaning bath 23. When the diluted buffer solution is to be supplied from diluted buffer solution storage unit 35 to first diluted staining solution preparation chamber 34a, valves v11 and v12 are opened. Then, an amount of the diluted buffer solution measured by diaphragm pump p4 is supplied from diluted buffer solution storage unit 35 to first diluted staining solution preparation chamber 34a. When the diluted buffer solution is to be supplied from diluted buffer solution storage unit 35 to second diluted staining solution preparation chamber 34b, valves v17 and v18 are opened. Then, an amount of the diluted buffer solution measured by diaphragm pump p5 is supplied from diluted buffer solution storage unit 35 to second diluted staining solution preparation chamber 34b.

When the undiluted solution of staining solution A is to be supplied from staining solution storage unit 36a to first diluted staining solution preparation chamber 34a, valves v10 and v11 are opened. Then, an amount of the undiluted solution of staining solution A measured by diaphragm pump p4 is supplied from staining solution storage unit 36a to first diluted staining solution preparation chamber 34a. When the undiluted solution of staining solution A is to be supplied from staining solution storage unit 36a to stain bath 22, valves v10 and v13 are opened. Then, the undiluted solution of staining solution A pressurized by a pump is supplied from staining solution storage unit 36a to stain bath 22.

When the undiluted solution of staining solution B is to be supplied from staining solution storage unit 36b to second diluted staining solution preparation chamber 34b, valves v16 and v17 are opened. Then, an amount of the undiluted solution of staining solution B measured by diaphragm pump p5 is supplied from staining solution storage unit 36b to second diluted staining solution preparation chamber 34b.

When diluted staining solution A is to be supplied from first diluted staining solution preparation chamber 34a to stain bath 24, valve v14 is opened and first diluted staining solution preparation chamber 34a is connected to a positive pressure. As a result, diluted staining solution A is pushed out and moved from first diluted staining solution preparation chamber 34a to stain bath 24.

When diluted staining solution B is to be supplied from second diluted staining solution preparation chamber 34b to stain bath 25, valve v19 is opened and second diluted staining solution preparation chamber 34b is connected to a positive pressure. As a result, diluted staining solution B is pushed out and moved from second diluted staining solution preparation chamber 34b to stain bath 25.

When methanol is to be supplied from methanol supply unit 44 to methanol storage unit 37, methanol storage unit 37 is connected to a negative pressure. As a result, methanol is sucked and moved from methanol supply unit 44 to methanol storage unit 37. When methanol is to be supplied from methanol storage unit 37 to methanol bath 21, valve v20 is opened. Then, an undiluted solution of methanol pressurized by a pump is supplied from methanol storage unit 37 to methanol bath 21.

(Smear Preparation Operation of Smear Preparing Apparatus)

Figure 8:
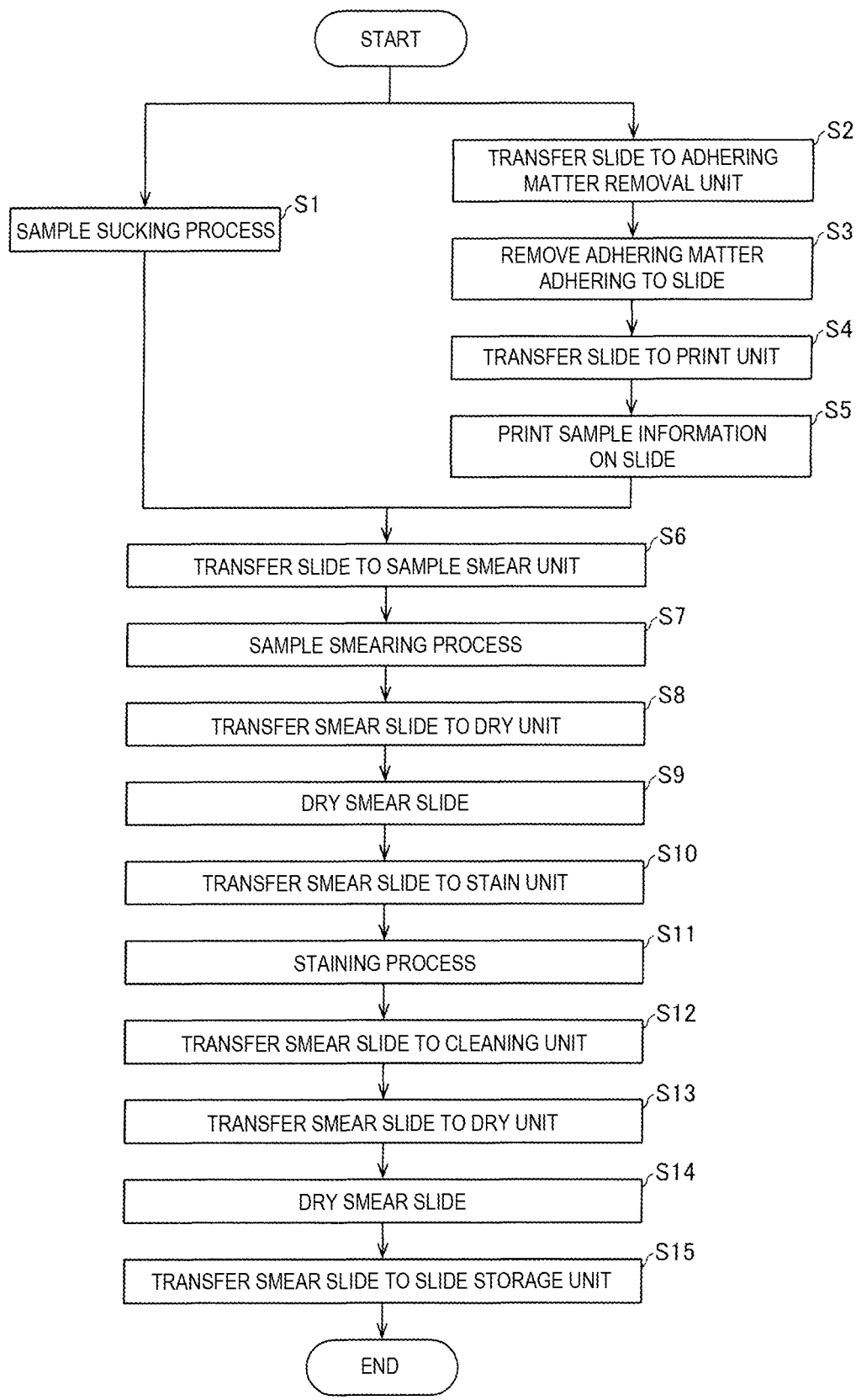
FIG. 8 is a flowchart for explaining a smear preparing process of the smear preparing apparatus according to an embodiment.

With reference to FIG. 8, a smear preparation operation of smear preparing apparatus 100 is described.

First, at step S1 of FIG. 8, a sucking process of a sample is performed. To be more specific, the sample for the smearing process is sucked from the target sample container. Simultaneously with the process at step S1, slide 10a is transferred to an adhering matter removal unit at step S2. To be more specific, slide 10a is supplied from slide supply unit 11 to slide transportation unit 16. Then, slide 10a being held by slide transportation unit 16 is transferred to the adhering matter removal unit. At step S3, the adhering matter removal unit performs a process of removing adhering matter on slide 10a being held by slide transportation unit 16.

At step S4, slide 10a is transferred to print unit 17. To be more specific, slide 10a being held by slide transportation unit 16 is transferred to print unit 17. At step S5, print unit 17 prints sample information on slide 10a being held by slide transportation unit 16.

At step S6, slide 10a is transferred to smear unit 12. To be more specific, slide 10a being held by slide transportation unit 16 is transferred to smear unit 12. At step S7, smear unit 12 performs a process of smearing the sample on slide 10a being held by slide transportation unit 16, and smear slide 10b is produced.

At step S8, smear slide 10b is transferred to dry unit 13. To be more specific, smear slide 10b is passed from slide transportation unit 16 to dry unit 13. At step S9, dry unit 13 performs a drying process on the sample smeared on smear slide 10b.

At step S10, smear slide 10b is transferred to stain unit 20. To be more specific, smear slide 10b is passed from dry unit 13 to stain unit 20. At step S11, stain unit 20 performs a staining process on the sample smeared on smear slide 10b.

At step S12, smear slide 10b is transferred to cleaning unit 26. To be more specific, smear slide 10b is passed from stain unit 20 to cleaning unit 26. Cleaning unit 26 cleans smear slide 10b. At step S13, smear slide 10b is transferred to dry unit 14. To be more specific, smear slide 10b is passed from cleaning unit 26 to dry unit 14.

At step S14, dry unit 14 performs the drying process on the stained sample smeared on smear slide 10b. Thus, a smear is prepared on smear slide 10b. At step S15, smear slide 10b is transferred to slide storage unit 15. To be more specific, smear slide 10b is passed from dry unit 14 to slide storage unit 15. Then, smear slide 10b with a prepared smear is accommodated in slide storage unit 15. After that, the smear preparation process is finished.

(Staining Process of Smear Preparing Apparatus)

Figure 9:
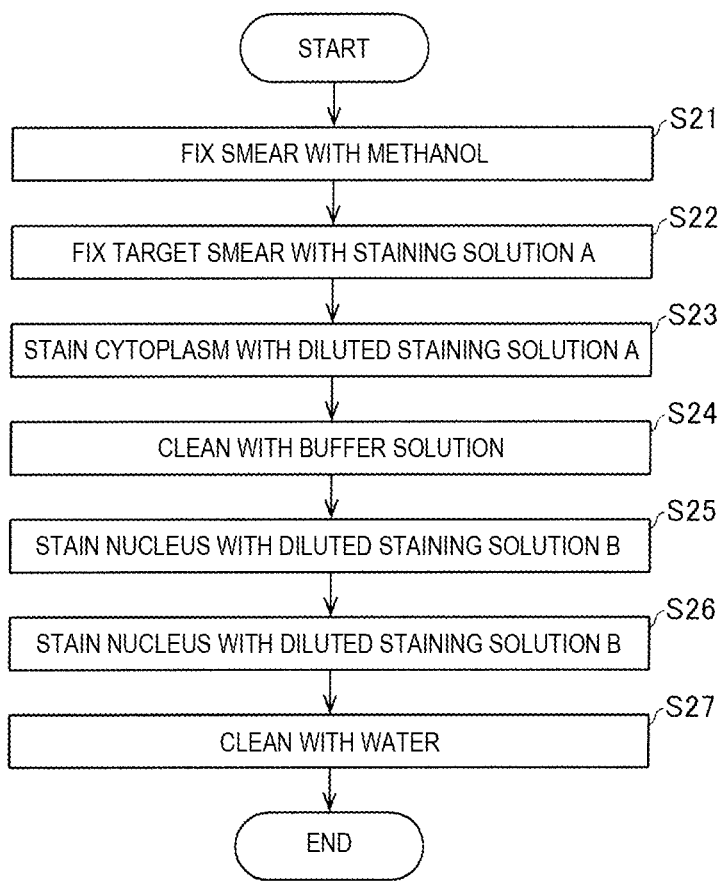
FIG. 9 is a flowchart for explaining a staining process of the smear preparing apparatus according to an embodiment.

With reference to FIG. 9, the staining process of smear preparing apparatus 100 is described.

First, at step S21 of FIG. 9, the smear is fixed with methanol. To be more specific, smear slide 10b is immersed in methanol in methanol bath 21. At step S22, highly-concentrated staining solution A fixes the target smear. To be more specific, smear slide 10b is immersed in the highly-concentrated staining solution of stain bath 22.

At step S23, cytoplasm is stained with diluted staining solution A. To be more specific, smear slide 10b is immersed in diluted staining solution A in stain bath 24.

At step S24, smear slide 10b is cleaned with a buffer solution. To be more specific, smear slide 10b is immersed in the diluted buffer solution in cleaning bath 23. At step S25, the nucleus is stained with diluted staining solution B. To be more specific, smear slide 10b is immersed in diluted staining solution B in stain bath 25. At step S26, the nucleus is stained with diluted staining solution B. To be more specific, smear slide 10b is transferred from stain bath 25 to another stain bath 25. Then, smear slide 10b is immersed in diluted staining solution B in stain bath 25 being the transfer destination.

At step S27, smear slide 10b is cleaned with water. To be more specific, smear slide 10b is immersed in water in cleaning unit 26. After that, the staining process is finished.

Note that the embodiment disclosed herein should be considered as an illustration in all respects and as a non-limiting embodiment. The scope of the invention is presented by the claims, not by the above description of embodiment, and includes all modifications within the meanings and the scope equivalent to the scope of the claims.

The invention claimed is:

1. A smear preparing apparatus comprising:
    a smear unit that prepares a smear slide by smearing a sample on a slide;
    a diluted solution storage unit that stores diluted solution or water;
    a buffer solution storage unit that stores highly-concentrated buffer solution;
    a buffer solution preparation unit that prepares diluted buffer solution by diluting the highly-concentrated buffer solution, supplied from the buffer solution storage unit, with the diluted solution or water, supplied from the diluted solution storage unit;
    a diluted staining solution preparation unit that prepares diluted staining solution by diluting a highly-concentrated staining solution with the diluted buffer solution prepared by the buffer solution preparation unit; and
    a stain unit that stains the smear slide prepared by the smear unit with the diluted staining solution.

2. The smear preparing apparatus according to claim 1, further comprising
    a cleaning unit that cleans the smear slide stained by the stain unit with the diluted solution or water stored in the diluted solution storage unit.

3. The smear preparing apparatus according to claim 1, wherein
    the diluted staining solution preparation unit comprises a first diluted staining solution preparation chamber and a second diluted staining solution preparation chamber that prepare different kinds of diluted staining solutions, and
    the stain unit stains the smear slide prepared by the smear unit with a diluted staining solution prepared by the first diluted staining solution preparation chamber, cleans the smear slide with the diluted buffer solution, stains the smear slide with a diluted staining solution prepared by the second diluted staining solution preparation chamber, and cleans the smear slide with water.

4. The smear preparing apparatus according to claim 1, further comprising
a housing, an interior of the housing separated by a partition into an upper space and a lower space, wherein
the smear unit and the stain unit are provided in the upper space, and
the buffer solution preparation unit and the diluted staining solution preparation unit are provided in the lower space.

5. The smear preparing apparatus according to claim 4, wherein
a slide supply unit that supplies a slide, a slide transportation unit that transfers the slide, and a print unit that prints information on the slide are further provided in the upper space, and
a diluted buffer solution storage unit that stores the diluted buffer solution and a buffer solution storage unit that stores the highly-concentrated buffer solution are further provided in the lower space.

6. The smear preparing apparatus according to claim 1, wherein
the buffer solution storage unit is capable of storing the highly-concentrated buffer solution or a prepared diluted buffer solution, and
in a condition in which the prepared diluted buffer solution is stored in the buffer solution storage unit, the buffer solution preparation unit supplies the prepared diluted buffer solution without dilution.

7. The smear preparing apparatus according to claim 6, wherein
the buffer solution preparation unit switches between a first operation of mixing the diluted solution stored in the diluted solution storage unit and the highly-concentrated buffer solution stored in the buffer solution storage unit, and a second operation of supplying the prepared diluted buffer solution without dilution.

8. The smear preparing apparatus according to claim 6, further comprising:
a smear preparing apparatus main body; and
a mount table on which the smear preparing apparatus main body is mounted and which comprises a storage section, wherein
the storage section houses a highly-concentrated buffer solution container containing the highly-concentrated buffer solution and a diluted solution container containing the diluted solution or water, or a diluted buffer solution container containing the prepared diluted buffer solution.

9. The smear preparing apparatus according to claim 1, wherein
the diluted solution storage unit comprises an introduction part that introduces the diluted solution or water and a diluted solution amount detector that detects an amount of the diluted solution or water stored, and
in a condition in which the diluted solution amount detector detects that the amount of the diluted solution or water stored in the diluted solution storage unit is equal to or less than a predetermined amount, the diluted solution or water is supplied via the introduction part to the diluted solution storage unit.

10. The smear preparing apparatus according to claim 1, wherein
in a condition in which an error occurs or a shutdown process is executed during preparation of the diluted buffer solution by the buffer solution preparation unit, the buffer solution preparation unit discharges a liquid being prepared to an outside of the buffer solution preparation unit.

11. The smear preparing apparatus according to claim 1, wherein
the stain unit is cleaned with cleaning liquid containing methanol and the diluted buffer solution.

12. The smear preparing apparatus according to claim 1, wherein
the stain unit comprises a stain bath comprising:
a hold section capable of holding a plurality of smear slides;
a liquid introduction part that introduces liquid to an inside of the stain bath; and
a liquid discharge part that discharges the liquid to an outside of the stain bath, and
while the plurality of smear slides are held by the hold section, the stain unit stains samples smeared on the plurality of smear slides with the diluted staining solution introduced from the liquid introduction part into the stain bath.

13. The smear preparing apparatus according to claim 12, wherein
the stain unit further comprises a methanol bath, the stain bath comprising a plurality of stain baths, and a cleaning bath, and
the stain unit fixes a smear with methanol in the methanol bath, fixes the smear with the highly-concentrated staining solution in a first stain bath of the plurality of stain baths, stains the smear with the diluted staining solution in a second stain bath of the plurality of stain baths, cleans the smear with the diluted buffer solution in the cleaning bath, stains the smear with the diluted staining solution in third and fourth stain baths of the plurality of stain baths, and cleans the smear with water.

14. The smear preparing apparatus according to claim 1, wherein
the buffer solution includes a phosphate buffer solution.

15. The smear preparing apparatus according to claim 1, wherein
the staining solution includes at least one of May-Grünwald solution, Giemsa solution, and Wright solution.

16. The smear preparing apparatus according to claim 1, wherein
the sample is blood.

17. The smear preparing apparatus according to claim 1, wherein
the buffer solution preparation unit is cleaned using the diluted buffer solution.

18. The smear preparing apparatus according to claim 1, further comprising
a sensor that measures a characteristic of the diluted buffer solution prepared by the buffer solution preparation unit, wherein
in a condition in which the characteristic measured by the sensor is out of a predetermined range, the buffer solution preparation unit discharges the diluted buffer solution to an outside of the buffer solution preparation unit.

19. A smear preparing method using a smear preparing apparatus comprising a smear unit, a diluted solution storage unit, a buffer solution storage unit, a buffer solution preparation unit, a diluted staining solution preparation unit, and a stain unit, the smear preparing method comprising:
- preparing a smear slide by smearing a sample on a slide with the smear unit;
- supplying highly-concentrated buffer solution to the buffer solution preparation unit from the buffer solution storage unit;
- supplying diluted solution or water to the buffer solution preparation unit from the diluted solution storage unit;
- preparing, with the buffer solution preparation unit, a diluted buffer solution by diluting the highly-concentrated buffer solution with the diluted solution or water;
- preparing a diluted staining solution by diluting a highly-concentrated staining solution with the diluted buffer solution prepared by the buffer solution preparation unit, with the diluted staining solution preparation unit; and
- staining the smear slide with the sample smeared thereon with the diluted staining solution with the stain unit.

\* \* \* \* \*